Sept. 28, 1954  A. H. SCHUTTE  2,690,384
GAS PRODUCER
Filed July 15, 1948
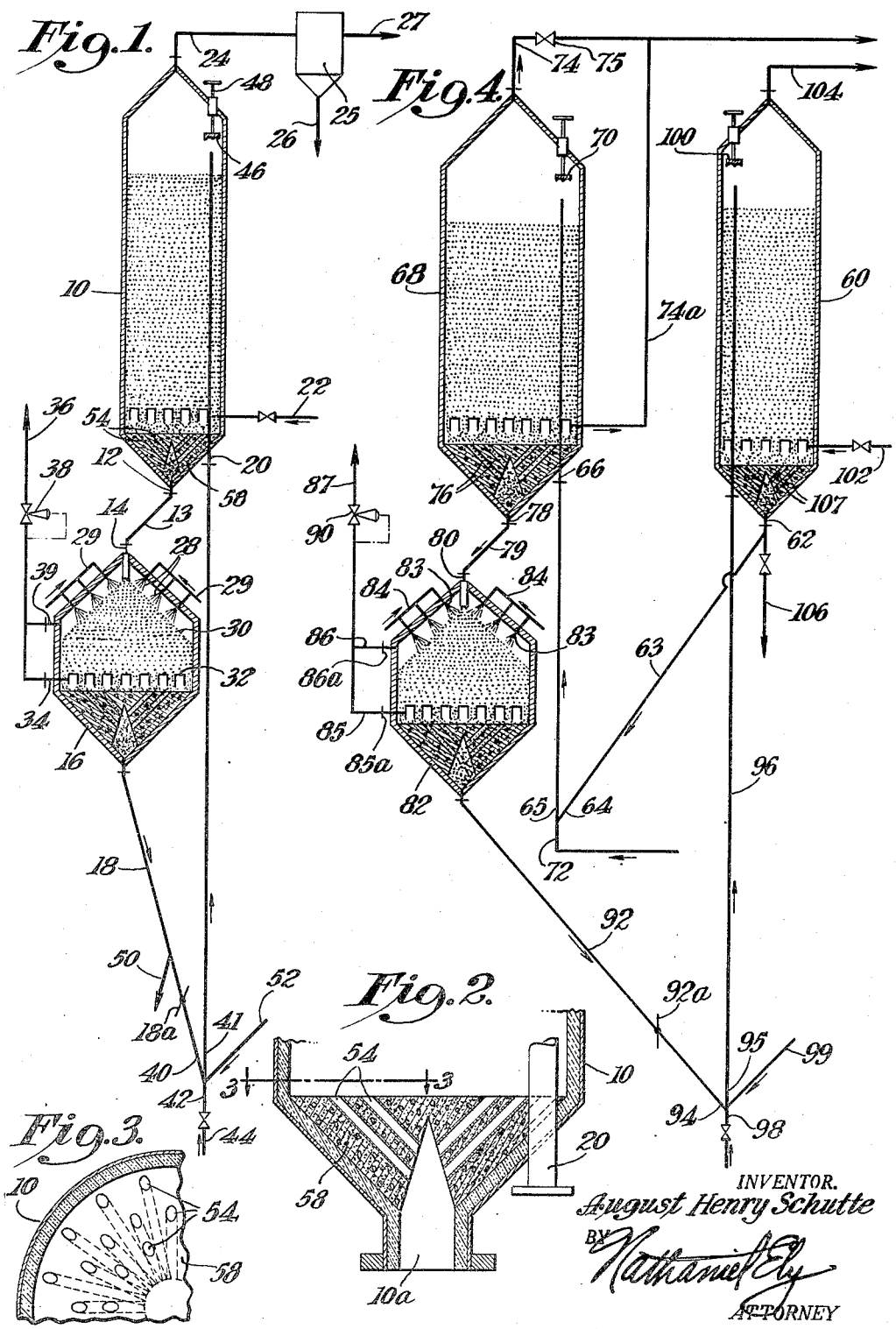
INVENTOR.
August Henry Schutte
BY Nathaniel Ely
ATTORNEY Patented Sept. 28, 1954

2,690,384

UNITED STATES PATENT OFFICE 2,690,384

GAS PRODUCER

August Henry Schutte, Hastings-on-Hudson, N. Y., assignor to The Lummus Company, New York, N. Y., a corporation of Delaware Application July 15, 1948, Serial No. 38,795

1 Claim. (Cl. 48—78)

This invention relates to improvements in the method and apparatus for carrying out high temperature vapor phase reactions in the presence of continuously circulating masses of gravity packed particles.

In my copending application Serial Number 634,498, filed December 12, 1945, now Patent No. 2,561,419, and entitled Process for Producing Gas From Oil, I have disclosed the use of gravity moving, gravity packed beds of coke for the production of commercial or "city" gas and in which the control of the reaction as well as the uniformity of product is superior to similar operations using either a fixed bed or a fluidized dispersed phase bed.

My present invention is a continuation of and an improvement on the invention heretofore described and is particularly effective for making water gas. It is primarily concerned with improved flow controls which are of major importance with the use of high temperature, gravity packed, gravity flowing deep beds useful for gas making, whether it be water gas, synthesis gas or commercial gas or other vapor phase reactions.

In addition, my present invention contemplates the provision of a continuous column of gravity packed discrete particles of contact material to serve as a seal between the various chambers to avoid flow of the vapors therebetween while permitting complete gravity packed flow of the dense bed downward through the reaction chambers, the dense column allowing the use of a vapor lift of the bed particles to the upper part of the system.

My invention as presently described further contemplates improved reheating of the bed particles as they move by gravity in a gravity packed manner through a reheating zone, such heating being accomplished by radiation, convection, or combustion or combinations thereof, but under conditions that assure uniformity of results.

It may also be considered that my invention, by the improved controls, makes possible a better chemical or physical reaction such as in gas making in which the products are more uniform and more readily controlled for predetermined yields.

Further objects and advantages of the invention will appear from the following destcription of preferred forms of embodiment thereof taken in connection with the attached drawings illustrative thereof, and in which:

Figure 1 is a schematic view with parts in section of the reactor, and reheater of a vapor phase reaction plant.

Figure 2 is an enlarged substantially central vertical cross section through the lower part of a reheater or reactor units of Figure 1 showing the flow control apparatus.

Figure 3 is a partial horizontal cross section taken substantially on the line 3—3 of Figure 2 and showing the lower part of a reactor or reheater unit.

Figure 4 is a schematic elevation similar to Figure 1 showing the units of a water-gas and oil-gas making plant.

In accordance with the preferred form of embodiment of my invention, the vapor phase reactor unit or vessel 10 is a substantially cylindrical vertically elongated vessel mounted at an elevated position and adapted to continuously receive a body of discrete particles of a refractory heat carrying material such as granular coke. This material is allowed to gravitate slowly without turbulence or agitation through the vessel 10 from which it discharges from outlet 12. It may then pass through conduit 13 and into inlet 14 of a reheater unit generally indicated at 16. In turn, the continuously moving, gravity packed, free flowing bed discharges from the reheater 16 through the outlet 18 and then, by means of conduit 20, will be returned to the reactor 10 above the upper level of the bed therein.

A typical reaction that can be carried out very effectively in this reactor-reheater unit is the well known water gas reaction. In such case, the heat carrying material may be a reasonably uniform coke of coal or petroleum origin and preferably of from $\frac{1}{8}''$ to $\frac{3}{4}''$ in size. In such case the steam is introduced to the hot bed through line 22 and is distributed over the lower part of the bed into contact with the substantially incandescent coke. The water-gas is then removed at 24 through the upper part of the generator. If desired, this gas may pass through a suitable separator 25 for the discharge of ash or solids at 26 and the gas will then pass at 27 to the usual water seals, purifiers, etc.

The temperature of the bed can be effectively raised in the reheater 16 either by direct combustion or by radiant heating or by convection heating or by combinations thereof. Radiant heaters are preferable in some cases due to the difficulty of uniformly burning hot coke particles and in such case a series of burners 28 may be mounted adjacent the upper or dome portion of the reheater being suitably supplied with a fuel gas through the manifold 29. By passing the contact material through a central inlet 14, a substantially uniform generally conical surface 30 of flowing contact material is exposed to the radiant heating effects of the burner 28, as a result, the material is uniformly heated as it passes downwardly through the reheater.

The products of combustion may be removed by means of a vapor recovery channel 32 at the lower part of the reheater under control of damper 34 in the flue gas discharge line 26. Pressure control 38 in line 36 maintains a uniform pressure on the system. If radiant heat alone is desired, the products of combustion from burners 28 may be removed above the bed through line 39. These gases may be passed through a waste heat boiler (not shown) if desired.

The contact material which has been reheated, discharges through the leg 18 and enters a Y-shaped or similar feed member through inlet 40 the vertical leg 41 being interconnected with the lift leg conduit 20. The bottom leg 42 is interconnected with a steam line 44, sufficient steam being provided to elevate the particles through the lift leg 20 into the upper part of the generator 10. Due to the difference in velocity of different size particles resulting from the carrying effect of the gases which is based upon a function of the square root of the particle diameter, it may be desirable to provide a streamlined exit target 46 adjustable as at 48 to reduce attrition on the particles.

Control of the gross flow of the contact particles through the generator 10 and reheater 16 may be through the use of the valve 18a in the discharge conduit 18, it being noted that the particle flow in this line is under gravity-packed, maximum density conditions. The steam in line 44 does not tend to fluidize the flowing material in the leg 18. If desired, an ash or fines draw-off may be provided at 50 in line 18 and make-up material may be introduced through line 52 at the bottom of the lift leg 20.

Flow control of the particles at the lower part of the respective beds is accomplished by suitable means to assure uniform cross sectional flow through the reheater and reactor. One example of a preferred form of control is shown more particularly in Figure 2 as indicative of operations at the bottom of the vapor phase reactor 10 into which the lift leg 20 projects. As shown in Figure 2 and Figure 3 the lower cone of the reactor is filled with a ceramic or insulating composition 58 in which are formed a series of ducts or conduits 54 of generally angular disposition with respect to the horizontal. The angle is preferably steeper than the normal angle of repose of the granular particles of the bed and the ducts or conduits thus permit free flow into the central discharge chamber 10a at the bottom of the reactor. The upper part of this chamber extends sufficiently high so that there will be no arching of the particles that discharge from the conduits 54.

As shown in Figure 3, the top openings of the conduits 54 are suitably spaced to assure uniform drawoff from the area above and passage of the particles downwardly. The flow control thus serves to assure complete uniformity of movement throughout the bed as well as to support the entire bed from the lower part of the reactor 10.

This is of major importance for with solids densities as great as 65 lbs. per cu. ft. and reactor diameters as great as 16 to 20 feet and depths as much as 30 or 40 feet the static load is measured in tons. This load must be transmitted to the vessel at extremely high temperatures by a structure which provides the proper solids flow passages. In addition there may be a vapor pressure drop load with concurrent vapor flow which may further add to the support problem.

The reactor 10 and reheater 16 may be used for various vapor phase reactions which are advantageously carried out in the presence of heated carrier particles such as coke. They are especially suited for operation as a water gas or synthesis gas plant where the large amount of endothermic reaction heat may be supplied by sensible heat of the circulated coke. For a preferred operation of a commercial size gas unit, approximately 230 tons per hour of coke may be circulated through the system. Approximately 1% is converted to water-gas and to convert 5500 lbs. of carbon to gas approximately 11,000 lbs. of steam per hour is required. This will produce approximately 8,350,000 std. cu. ft./day of gas.

In general, for a unit of this size the reactor 10 is about 10 ft. in diameter and approximately 40 ft. in height overall thus providing a bed which may be as much as 30 feet in depth. The reheater 16 is about 14 ft. in diameter and about 20 ft. in height overall thus having about a 10 foot depth of bed. The entire elevation is not excessive as compared to present practice on other types of generators.

Sealing between zones is accomplished by the inlet leg 13 and discharge leg 18 which carry a dense columns of contact particles to effectively resist flow of vapors. The leg 18 may be about 30 feet long for a pressure resistance of about 6 lbs. per sq. in. Steam purge lines may also be used if desired.

A modified form of construction is shown in Figure 4 and, in this case, the reactor generally indicated at 60 may also be of a water-gas type corresponding with the water-gas generator 10 and the coke which passes therethrough discharges through outlet 62 and down conduit and seal leg 63. In this case, instead of entering the reheater, it enters leg 64 of a suitably shaped feed member, the leg 65 being interconnected to a lift leg 66 which discharges into second reactor generally indicated at 68. In this case this may be primarily for producing oil gas and the heavy oil enters the lower leg 72 of the feeding member.

The contact of hydrocarbon with high temperature contact material immediately causes a substantial release of primary flash vapors which can do all or most of the lifting work for elevating the contact material through the lift leg 66 to the upper part of the reactor 68. With the substantially non-porous contact material, there is no appreciable absorption of the liquid and the liquid that is to be converted into oil-gas in reactor 68 is carried on the particles as a thin liquid film through the lift leg. The particles in the lift leg 66 are thus "wetted" by residual liquid and evolve vapor continuously through the passage up the lift leg but any tendency for coke deposits or agglomeration to form will be prevented by the mass flow of the solids in the lift leg. A streamlined discharge target 70 may be used on the end of lift leg 66.

The oil-gas reaction is carried out at a somewhat lower temperature than the water-gas reaction and the bed temperature in oil-gas generator 68 is approximately 1500° F. This, however, can readily be maintained as the typical temperature of discharge of particles from the water-gas reactor 60 through line 63 is about 1800° F.

As the bed moves downward slowly and continuously in gravity packed condition and solely by gravity through oil-gas generator 68 the oil carried by the particles is converted to dry coke on the particles and oil-gas which is discharged primarily through the line 74a. A branch line 74 having valve 75 which is normally closed may be used as a starting line.

As in the prior apparatus a flow control unit consisting of refractory or ceramic material filling the lower part of the vessel is provided with angularly disposed ducts 76 so that there is a uniform movement of all particles within the bed. These discharge from reactor 68 through the outlet 78, through conduit 79, and into inlet 80 of the reheater 82.

Reheater 82 is in all respects the same as the reheater 16 and is provided with radiant burners 83 supplied by fuel gas from the manifold 84 and the products of combustion are removed from line 85 from the lower part of the reactor for convection effect or through the line 86 from the upper part of the reactor if only radiation is desired. Dampers 85a and 86a are provided in the respective line 85 and 86 and a pressure controller at 90 is provided on the flue gas line 87. If combustion is desired, a suitable oxygen containing gas may be introduced through the manifold 84.

In the reheater 82 the contact particles are raised to a suitable temperature for reuse in the system. Preferably they are raised to a temperature of approximately 2000° F. which is sufficient for the water gas reaction as previously described. These particles will then pass as a gravity packed mass through the conduit 92 the rate being controlled by the valve 92a and will enter the leg 94 of a feed member the vertical leg 95 of which is interconnected with the gas lift leg 96 by which the particles are returned to the water gas reactor 60. Steam is introduced at 98 to the bottom of this leg in such a manner as to suspend and carry the particles as a suspended mass as in the first operation with reference to the lift leg 20. Makeup coke, if necessary, is introduced at 99 it being found that approximately 1% of the circulating material is utilized in the water gas reaction. A streamlined target 100 may be used at the top of the discharge pipe 96 as in the other operations.

In the water gas operation, steam is introduced at 102 with a water gas being removed overhead at 104 the lines 74 and 104 being joined if desired. Net calcined coke drawoff from the water gas reactor 60 may be accomplished at 106. As previously indicated with respect to the bottom of the oil gas reactor 68, a flow control such as shown in Figure 2 is also embodied in the bottom of the water gas reactor at 107.

The oil-gas water-gas unit charges a heavy residual oil and makes water gas from part or all of the petroleum coke produced. If desired for regular or seasonal operation, the oil-gas generator bed temperature may be lowered and high yields of valuable aromatics and olefins produced. Depending upon the type of gas produced and the character of the oil charged, net product coke may be produced in calcined form and in usable size. This is a distinct advantage over the fluid type of gas making process which produces only finely powdered soot.

Aside from city gas manufacture the making of straight water gas will be an increasingly important tool since it starts with carbon and water and produces a Fischer-Tropsch feed gas from which all sorts of fuels, chemicals and plastics are produced. Only a simple apparatus is required as will be apparent.

With a water gas-oil gas unit such as disclosed in Figure 4 and assuming 230 tons per hour circulation as in the case of Figure 1 there is a yield of 8,350,000 std. cu. ft. per day of water gas and if a charge of 1580 barrels per day of preheated heavy oil is added at 72 to the oil gas reactor, it is possible to make 6,650,000 std. cu. ft./day of oil gas.

It will be apparent that I have not only shown and described a continuous gas making apparatus, but also have described one that will be economical to build and operate and will have unusual operating flexibility as for Fischer-Tropsch synthesis. I can regularly produce straight water gas in large quantities and if a specification quality gas for "city" use be required, I can use the economical multiple step operation previously described.

The reactor may be used for different vapor phase reactions, the vapors being introduced at the upper or lower part of the reactor and moved concurrently or countercurrently with the bed. In the water gas operation, the bed serves as a scrubber, making a cleaner gas and reducing external cleaning demands.

It is also important to make a deep, non-turbulent bed available, especially in water-gas generation for it has been found that a shallow bed of relatively uniform temperature is one that produces large amounts of carbon dioxide of no calorific value rather than the desired carbon monoxide. It is also important to have a gravity packed bed of high density since the rate of gas making is based on the rate of coke throughput. The dense packed bed thus requires about ⅓ the vessel volume of the fluidized bed with the resultant economy of construction.

In the circulation of coal coke, it is possible to tolerate a high ash content because the large size particles have far less tendency to fusing and agglomeration. It is also possible to operate at minimum temperatures without undue yields of carbon dioxide inasmuch as the gas vapors are superheated by the time they hit the hottest part of the bed and pass from the reactor. It is possible too, to operate nearer the ash fusion point with the larger sized particles. When charging high ash content coke from coal or coal itself, some of the ash will go overhead as a fly ash while some will form clinker like particles which make up a considerable portion of the circulating material.

In the reheating zone, the preferred heat is from fuel gas. It is also possible to use tarry by-products rather than gas or the coke itself with further economies of operation.

Separation of the gases from the contact particles is a relatively simple problem for in the reactor 10 the gas velocity is such that the contact material will readily gravitate out. In other words, the reactor itself is a separator which is effective on the large particles of the bed. While an auxiliary fines separator may be used in addition, the absence of powder eliminates need of complicated washers and scrubbers.

While I have shown and described preferred forms of embodiment of my invention, I am aware that modifications may be made thereto within the scope and spirit of the description herein and of the claim appended hereinafter.

I claim:

A gas generator comprising a first vertical reactor vessel having a particulate solids inlet adjacent the top and a particulate solids outlet adjacent the bottom, a steam inlet adjacent the lower part of the first reactor vessel and a water gas outlet at the upper part, a second vertical reactor having a particulate solids inlet adjacent the top and a particulate solids outlet adjacent the bottom, interconnected conduit means extending from the bottom of the first reactor vessel to the solids inlet of the second reactor vessel, a part of said conduit means being substantially vertical and having a heavy oil inlet at approximately the lowest point thereof, a reheater vessel in communication with the bottom of the second reactor, means to introduce fuel gas in said reheater vessel, means to remove products of combustion from the upper and lower parts of said reheater vessel, control means in said products of combustion removal means to vary the amount of products of combustion removed from the upper and lower part of the reheater vessel, interconnected conduit means in communication with the bottom of the reheater vessel and the solids inlet to the first reactor, a part of said communicating conduit means being substantially vertical, a steam inlet at the lowermost part of said communicating conduit means to carry particles from the lowermost part of said communicating conduit means to the first reactor vessel, means to add coke to the said communicating conduit means, and means to draw off coke from the generator, said second reactor vessel having a gas drawoff for the removal of oil-gas therefrom, said generator being adapted to the circulation of coke which is preheated in the reheater vessel and in which the heated coke in passing through the first reactor vessel at a high temperature will convert the steam to water gas, after which the coke at a slightly lower temperature will pass through the second reactor vessel wherein it reacts with the oil to produce oil-gas, after which the coke is returned to the reheater vessel.

References Cited in the file of this patent

UNITED STATES PATENTS

| Number | Name | Date |
|---|---|---|
| 526,364 | Fourness | Sept. 18, 1894 |
| 1,718,830 | Nielson et al. | June 25, 1929 |
| 1,731,223 | Brady | Oct. 8, 1929 |
| 2,370,234 | Degnen et al. | Feb. 27, 1945 |
| 2,393,893 | Evans et al. | Jan. 29, 1946 |
| 2,398,759 | Angell | Apr. 23, 1946 |
| 2,412,135 | Evans et al. | Dec. 3, 1946 |
| 2,429,359 | Kassel | Oct. 21, 1947 |
| 2,432,503 | Bergstrom et al. | Dec. 16, 1947 |
| 2,437,222 | Crowley | Mar. 2, 1948 |
| 2,445,554 | Bergstrom | July 20, 1948 |
| 2,461,021 | Atwell | Feb. 8, 1949 |
| 2,508,993 | Crowley | May 23, 1950 |
| 2,554,263 | Nelson | May 22, 1951 |
| 2,555,210 | Waddill | May 29, 1951 |
| 2,596,610 | Shabaker | May 13, 1952 |